United States Patent
Guyon et al.

(10) Patent No.: US 7,222,592 B2
(45) Date of Patent: May 29, 2007

(54) WATER OUTLET BOX PROVIDED WITH A THERMOSTAT AND MANUFACTURING PROCESS

(75) Inventors: David Guyon, Ingersheim (FR); Claude Vallet, Racrange (FR); Richard Komurian, Turckheim (FR)

(73) Assignee: Mark IV Systemes Moteurs, Courbevoie (FR)

( * ) Notice: Subject to any disclaimer, the term of this patent is extended or adjusted under 35 U.S.C. 154(b) by 0 days.

(21) Appl. No.: 10/517,433

(22) PCT Filed: Jun. 12, 2003

(86) PCT No.: PCT/EP03/06083

§ 371 (c)(1),
(2), (4) Date: Jun. 30, 2005

(87) PCT Pub. No.: WO03/106824

PCT Pub. Date: Dec. 24, 2003

(65) Prior Publication Data

US 2005/0252462 A1    Nov. 17, 2005

(30) Foreign Application Priority Data

Jun. 12, 2002   (FR) .................................. 02 07224

(51) Int. Cl.
*F01P 7/14* (2006.01)
(52) U.S. Cl. .................. 123/41.08; 236/34.5; 123/41.1
(58) Field of Classification Search ............... 123/41.1, 123/41.08, 41.09, 41.82 R; 236/34.5
See application file for complete search history.

(56) References Cited

U.S. PATENT DOCUMENTS

| | | | |
|---|---|---|---|
| 6,112,706 A | 9/2000 | Heer | |
| 6,347,745 B1 * | 2/2002 | McClure | 236/34.5 |

FOREIGN PATENT DOCUMENTS

| | | |
|---|---|---|
| EP | 0 810 069 A1 | 12/1997 |
| EP | 0 825 372 A1 | 2/1998 |
| EP | 0 825 510 A1 | 2/1998 |

* cited by examiner

*Primary Examiner*—Stephen K. Cronin
*Assistant Examiner*—Hyder Ali
(74) *Attorney, Agent, or Firm*—Berenato, White & Stavish

(57) ABSTRACT

A water out-let box comprising a regulating thermostat principally made up of a valve to block an opening of a passage emerging in the box, the valve being stressed against its seat, formed by the peripheral edge of the above-mentioned opening, by an elastic loading means and moved away from the seat by a pressure means that reacts to heat, the means with opposed actions resting, directly or indirectly, on a stress-absorbing clamp which also ensures that the thermostat is mounted and positioned in cooperation with an opposed bearing. Box is produced in a thermoplastic material and comprises, on the internal face of its constitutive wall (1'), at least two internal protrusions (10, 10') providing permanent support surfaces (10") for the clamp (9) of the thermostat (2), before and after installation of the box (1).

7 Claims, 2 Drawing Sheets ations, in relation to said bearing 6.

WATER OUTLET BOX PROVIDED WITH A THERMOSTAT AND MANUFACTURING PROCESS

TECHNICAL FIELD

The present invention relates to the field of means for regulating fluid circulation, particularly in relation to equipment for automobile vehicles. Its object is a water outlet box provided with a thermostat, and a manufacturing process for such a box with an integral thermostat.

BACKGROUND ART

Outlet boxes for thermal engines are generally installed in the region of the cylinder heads of said engines, or mounted directly thereon, and provide controlled cooling of said cylinder heads, by regulating the flow of cooling liquid in contact therewith.

These thermostats comprise essentially a valve mounted in mobile translation, to block or release an opening in said box, guided over a spindle and subject to the opposed stresses of an elastic means, such as a compression spring, forcing said valve in the closed position and a heat activated means, such as a wax cartridge, forcing said valve in the open position counter to the above-mentioned elastic stress.

Various embodiments of such a water outlet box are already known, but they all have limitations in terms of manufacturing costs and/or complexity of manufacturing and/or installation.

Thus, according to a first known embodiment, the thermostat is enclosed in a metal shell providing the valve seat and an opposed wall portion to absorb stresses, having an external radial edge intended to be squeezed between the two parts constituting said box assembled by screwing, with a peripheral sealing strip placed between them. This results in a complex, costly structure that requires special additional impermeability.

According to a second known embodiment, the box is made of a thermosetting material or of aluminium and comprises an opening forming a valve seat and opposed lips to support the stress-absorbing clamp of the thermostat.

Said box may be made in a single piece being attached directly to the cylinder head or in two parts assembled by mechanical means of connection, with a sealing strip placed between them.

A third existing solution proposes producing the body of the box in a plastics material, which box comprises an opening forming a valve seat and radial tongues to engage the stress-absorbing clamp and temporarily retain the thermostat, between its mounting in the box and fixing said box on the cylinder head. After fixing, the clamp rests directly on said cylinder head, which absorbs all the axial stresses applied in the opposite direction to the valve. Nevertheless, in this last solution, it is also necessary to make a special assembly with a sealing strip interposed.

Consequently, the problem posed consists of overcoming the limitations of the existing solutions set out above and providing a water outlet box incorporating a thermostat in the form of a pre-fabricated module, preferably closed.

DISCLOSURE OF INVENTION

For this purpose, the object of the present invention is a water outlet box, in particular for the cylinder head of an internal combustion engine, comprising a regulating thermostat substantially consisting of a valve to block an opening of a passage emerging in said box, said valve being carried and centred by a portion of frontal spindle engaged in a bearing, which is integral with the box, stressed against its seat, formed by the peripheral edge of the above-mentioned opening, by an elastic loading means and moved away from said seat by a pressure means which reacts to heat, said means with opposed actions resting, directly or indirectly, on a stress-absorbing clamp which also ensures that said thermostat is mounted and positioned in cooperation with said bearing, characterised in that said box is produced in a thermoplastic material and comprises, on the internal face of its constitutive wall, at least two internal protrusions providing permanent support surfaces for the clamp of said thermostat, before and after installation of said box.

BRIEF DESCRIPTION OF THE DRAWINGS

The invention will be better understood, using the description below, which relates to a preferred embodiment, given as a non-restrictive example, and explained with reference to the accompanying diagrammatic drawings, in which.

BEST MODE FOR CARRYING OUT THE INVENTION

Figure 1:
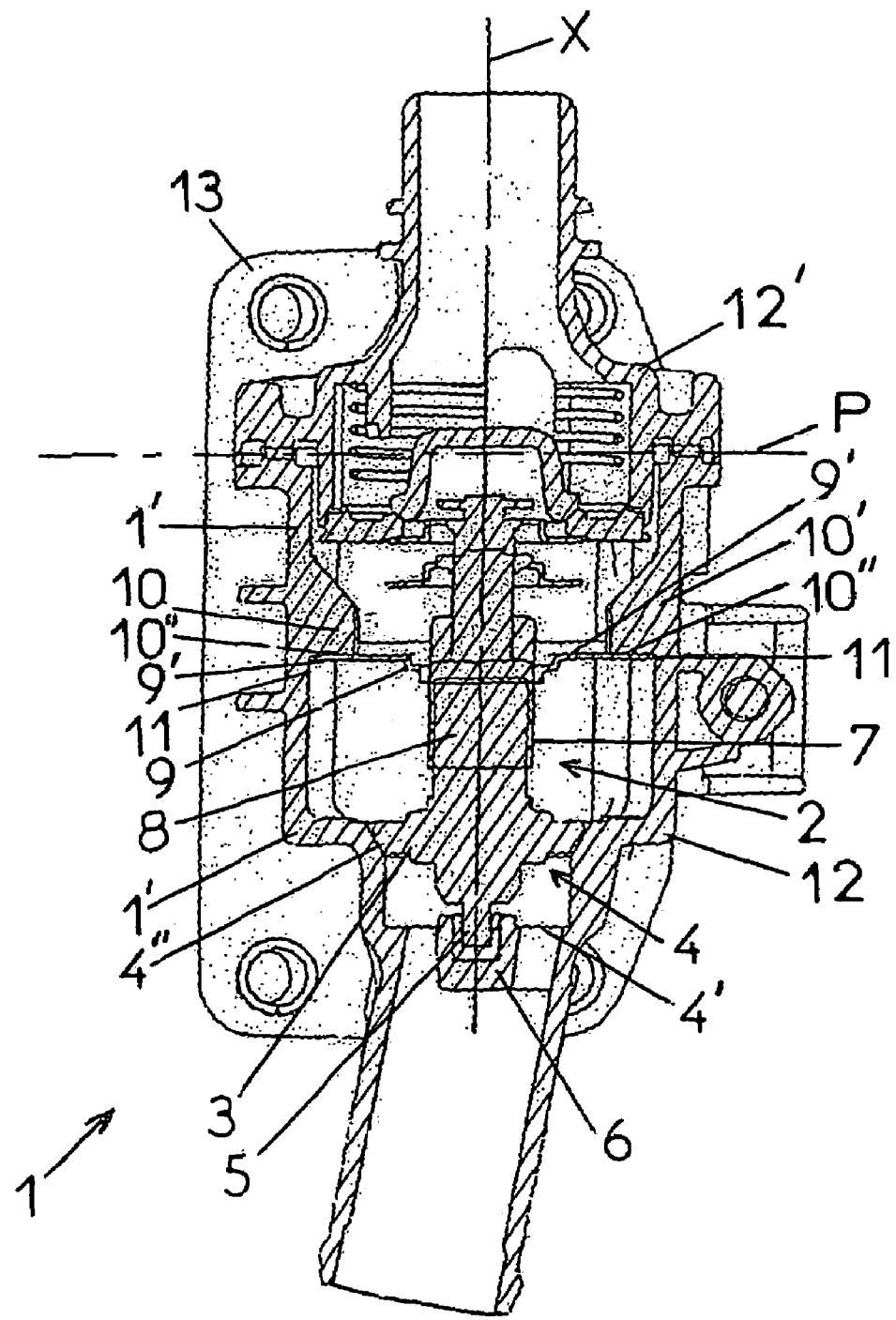
FIG. 1 is a view in cross-section along a plane passing through the longitudinal axis of the thermostat of a water box according to the invention, and, FIG. 2 is a perspective view in the direction of the opening to be blocked, of the internal volume of the first part of the box according to the invention.

As shown by the figures of the accompanying drawings, the water outlet box 1 comprises a regulating thermostat 2 which is substantially formed by a valve 3 intended to block an opening 4 of a passage 4' emerging into said box 1, said valve 3 being carried and centred by a portion of frontal spindle 5 engaged in a bearing 6 integral with the box 1.

The valve is stressed against its seat 4", formed by the above-mentioned peripheral edge of the opening 4, by an elastic loading means 7 and moved away from said is seat 4" by pressure means 8 that reacts to heat, said means 7 and 8 with opposed actions resting, directly or indirectly, on a stress-absorbing clamp 9 that also ensures the assembly and positioning of said thermostat 2 in cooperation with said bearing 6.

In accordance with the invention, said box 1 is made of a thermoplastic material and comprises, on the internal face of its constitutive wall 1', at least two internal protrusions 10, 10' providing permanent support surfaces 10" for the clamp 9 of said thermostat 2, before and after installation of said box 1.

According to a simple and advantageous embodiment of the invention, the clamp 9 has a structure in the form of a small plate and comprises two opposed lateral legs 9' and the protrusions 10 and 10' consist of two opposed internal radial projections of the wall 1' of the water box 1 formed in one piece with the wall.

Preferably, the two opposed radial projections 10 and 10' are formed by localised thickenings of the wall 1' of the box 1 having, in the direction of the bearing 6 receiving the portion of spindle 5 integral with the valve 3, support surfaces 10" situated in a plane perpendicular to the longitudinal axis X of the thermostat 2, the portions 11 of the internal face of the wall 1' adjoining said support surfaces 10" of projections 10, 10' constituting the centring surfaces, coaxial to the internal surface of said bearing 6 and intended to cooperate with the ends of the legs 9' of the clamp 9 to retain the clamp laterally.

Said projections 10, 10' comprise connecting interfaces with the large-area wall 1', providing good resistance to shearing through good distribution of stresses.

Figure 2:
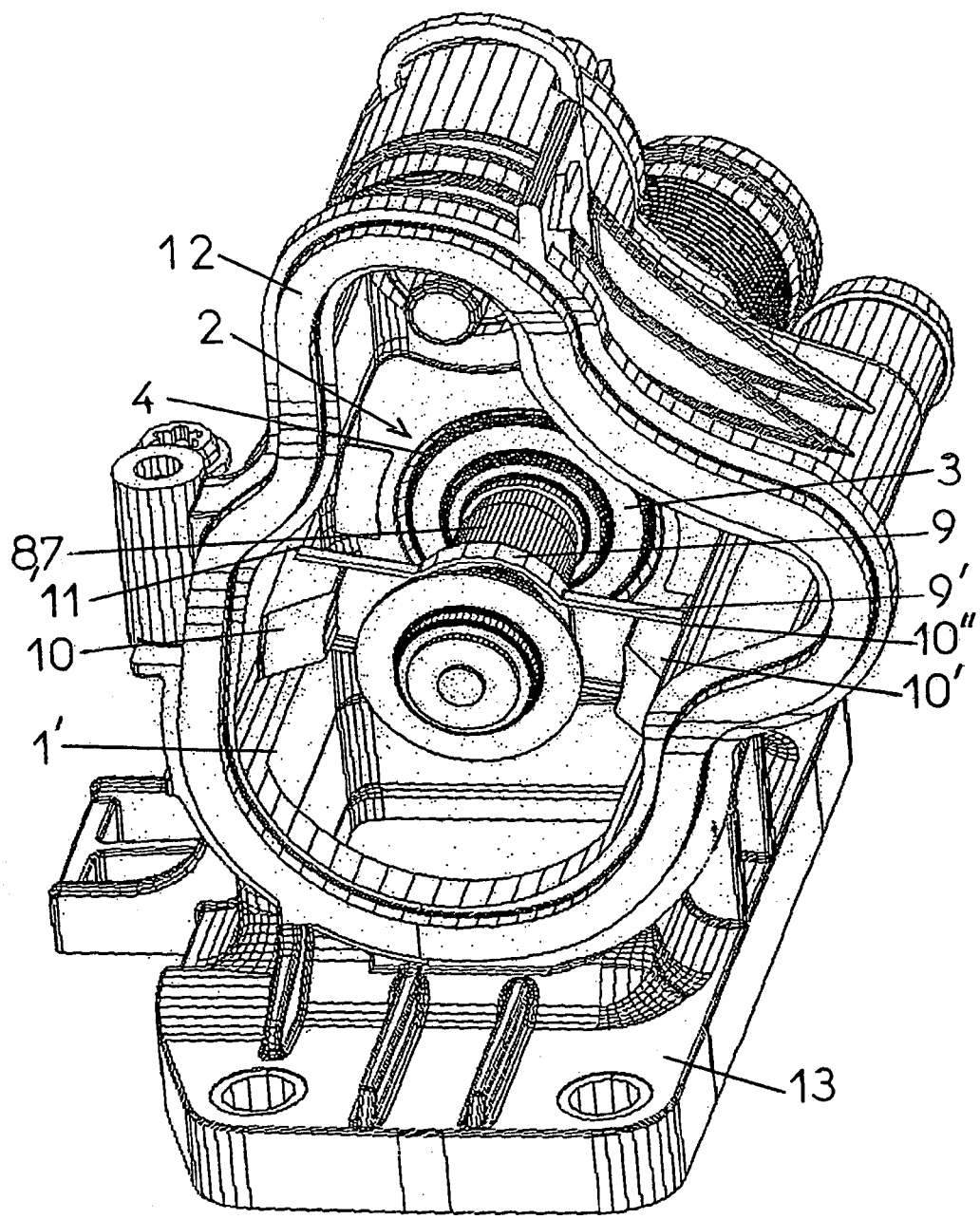

As shown in FIGS. 1 and 2 of the accompanying drawings, the box 1 has, advantageously, a cylindrical structure with a circular section, of which the longitudinal axis merges with the axis X of the thermostat 2 in the mounted state, the internal protrusions 10, 10' extending, viewed in a plane perpendicular to the axis X of the box 1, along two restricted arcs of a circle and forming two diametrically opposed annular portions.

In accordance with a practical variant embodiment producing a closed water outlet box module 1, the box is formed of two complementary parts 12 and 12' assembled together by vibration welding at a joint face P perpendicular to the axis X of the thermostat 2 in the mounted state and situated beyond the internal protrusions 10, 10'.

One of the constitutive parts 12, 12' may, for example, be integral with or comprise a fixing plate 13 of which the shape and configuration are suited to the installation site of said water outlet box 1.

To secure the assembly of the thermostat 2 in the box 1, provision may be made for support surfaces 10" comprising sites, recessed or protruding, for indexing or engaging the lateral legs 9' of the stress-absorbing clamp 9 of the thermostat 2, intended, if necessary, to engage in a complementary manner with the specific formation of said legs 9'.

If necessary, the legs 9' may therefore have folded edges providing lateral wedging of said legs on said projections 10, 10'.

According to an additional characteristic of the invention, the two constitutive parts 12, 12' are produced advantageously in PA66 containing glass fibres.

The object of the invention is also a manufacturing process for the water outlet box 1 as described above.

In accordance with the invention, this process consists essentially of providing a first open part of box 12, of substantially cylindrical shape and comprising an opening 4 forming a valve seat and at least two opposed internal protrusions 10, 10' provided with support surfaces 10" directed towards said opening 4, then in providing and introducing a thermostat 2 in said first box part 12 in such a way that the portion of frontal spindle 5 adjacent to the valve 3 is engaged in the bearing 6, in then compressing the elastic means 7 and applying the valve 3 against its seat 4" by pushing the stress-absorbing clamp 9 in the direction of the portion of frontal spindle 5 beyond the plane comprising the support surfaces 10" of the protrusions 10, 10', in turning said clamp 9 about the longitudinal axis X of the thermostat 2, while maintaining the pressure, until the lateral legs 9' of said clamp 9 are situated opposite said support surfaces 10", in then releasing said pressure in such a way that said legs 9' come to rest against said surfaces 10" and, possibly, engaging said legs 9' with said support surfaces 10" and, finally, in providing a second part 12' of the water outlet box, which is complementary to the first part 12, and positively connecting it to the first part by vibration welding.

Of course, the invention is not restricted to the embodiment described and illustrated in the accompanying drawings. Modifications are possible, in particular from the point of view of the formation of the various elements or by substitution of equivalent techniques, without however departing from the scope of protection of the invention.

The invention claimed is:

1. Water outlet box, in particular for the cylinder head of an internal combustion engine, comprising a regulating thermostat substantially including a valve to block an opening of a passage emerging in said box, said valve being carried and centered by a portion of frontal spindle engaged in a bearing, which is integral with the box, stressed against its seat, formed by the peripheral edge of the opening, by an elastic loading means and moved away from said seat by a pressure means which reacts to heat, said means with opposed actions resting, directly or indirectly, on a stress-absorbing clamp which also ensures that said thermostat is mounted and positioned in cooperation with said bearing, wherein said box (1) is produced in a thermoplastic material and comprises, on the internal face of its constitutive wall (1'), at least two internal protrusions (10, 10') providing permanent support surfaces (10") for the clamp (9) of said thermostat (2), before and after installation of said box (1), and wherein the clamp (9) has a structure in the form of a small plate and comprises two opposed lateral legs (9') and that the protrusions (10 and 10') consist of two opposed internal radial projections of the wall (1') of the water box (1) formed in one piece with the wall.

2. Box according to claim 1, wherein the two opposed radial projections (10 and 10') are formed by localized thickenings of the wall (1') of the box (1) having, in the direction of the bearing (6) receiving the portion of spindle (5) integral with the valve (3), support surfaces (10') situated in a plane which is perpendicular to the longitudinal axis (X) of the thermostat (2), the portions (11) of the internal face of the wall (1') adjoining said support surfaces (10") of the projections (10, 10') constituting the centering surfaces, coaxial to the internal surface of said bearing (6) and intended to cooperate with the ends of the legs (9') of the clamp (9) to retain the clamp laterally.

3. Box according to claim 1, characterised in that it has a cylindrical structure with a circular section, of which the longitudinal axis merges with the axis (X) of the thermostat (2) in the mounted state, the internal protrusions (10, 10') extending, viewed in a plane perpendicular to the axis (X) of the box (1), along two restricted arcs of a circle and forming two diametrically opposed annular portions.

4. Box according to claim 1, characterised in that it is made of PA66 containing glass fibres.

5. Box according to claim 1, characterised in that it is formed of two complementary parts (12 and 12') assembled together by vibration welding at a joint face (P) perpendicular to the axis (X) of the thermostat (2) in the mounted state and situated beyond the internal protrusions (10, 10').

6. Box according to claim 1, characterised in that the support surfaces (10') comprise sites, recessed or protruding, for indexing or engaging the lateral legs (9') of the stress-absorbing clamp (9) of the thermostat (2), intended, if necessary, to engage in a complementary manner with the specific formation of the said legs (9').

7. Water outlet box, for the cylinder head of an internal combustion engine, comprising a regulating thermostat substantially including a valve to block an opening of a passage emerging in said box, said valve being carried and centred by a portion of frontal spindle engaged in a bearing, which is integral with the box, stressed against its seat, formed by the peripheral edge of the above-mentioned opening, by an elastic loading means and moved away from said seat by a pressure means which reacts to heat, said means with opposed actions resting, directly or indirectly, on a stress-absorbing clamp which also ensures that said thermostat is mounted and positioned in cooperation with said bearing, characterised in that said box (1) is produced in a thermoplastic material and comprises, on the internal face of its constitutive wall (1'), at least two internal protrusions (10, 10') providing permanent support surfaces (10") for the clamp (9) of said thermostat (2), before and after installation of said box (1), said constitutive wall (1') being integral with said box and said internal protrusions (10, 10') being formed in one piece with said constitutive wall (1').

* * * * *